(12) United States Patent
Simske

(10) Patent No.: US 10,515,267 B2
(45) Date of Patent: Dec. 24, 2019

(54) AUTHOR IDENTIFICATION BASED ON FUNCTIONAL SUMMARIZATION

(71) Applicant: Hewlett-Packard Development Company, L.P., Houston, TX (US)

(72) Inventor: Steven J Simske, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 129 days.

(21) Appl. No.: 15/519,094

(22) PCT Filed: Apr. 29, 2015

(86) PCT No.: PCT/US2015/028220
§ 371 (c)(1),
(2) Date: Apr. 13, 2017

(87) PCT Pub. No.: WO2016/175786
PCT Pub. Date: Nov. 3, 2016

(65) Prior Publication Data
US 2017/0228591 A1     Aug. 10, 2017

(51) Int. Cl.
*G06F 16/00*     (2019.01)
*G06K 9/00*     (2006.01)
(Continued)

(52) U.S. Cl.
CPC ....... *G06K 9/00469* (2013.01); *G06F 16/337* (2019.01); *G06F 16/345* (2019.01);
(Continued)

(58) Field of Classification Search
CPC ......... G06F 17/30702; G06F 17/30719; G06F 17/30867; G06F 17/27; G06F 17/274;
(Continued)

(56) References Cited

U.S. PATENT DOCUMENTS 7,292,972 B2    11/2007 Lin et al.
9,450,771 B2 *   9/2016 Browning ........... H04L 12/1831
(Continued)

FOREIGN PATENT DOCUMENTS

WO    WO-2014-058433 A1    4/2014

OTHER PUBLICATIONS

Elayidom, M.S. et al, "Text Classification for Authorship Attribution Analysis", Sep. 2013.
(Continued)

*Primary Examiner* — Vincent F Boccio
(74) *Attorney, Agent, or Firm* — HP Inc. Patent Department

(57) ABSTRACT

Author identification based on functional summarization is disclosed. One example is a system including a plurality of summarization engines, each summarization engine to receive, via a processing system, a text content to provide a summary of the text content. At least one meta-algorithmic pattern is applied to at least two summaries to provide a meta-summary of the text content using the at least two summaries. A content processor identifies, from the meta-summary, authorship features associated with the text content. An evaluator determines, for a given category, a category value of the meta-summary, the category value indicative of a similarity of the authorship features to the category. A selector selects, for the given category, a combination of meta-algorithmic patterns and summarization engines that provides the meta-summary that optimizes the category value for the text content.

15 Claims, 8 Drawing Sheets

(51) Int. Cl.
*G06F 16/335* (2019.01)
*G06F 16/34* (2019.01)
*G06F 16/9535* (2019.01)
*G06F 21/64* (2013.01)
*G06F 17/27* (2006.01)
*G06Q 30/02* (2012.01)
*G06Q 50/00* (2012.01)

(52) U.S. Cl.
CPC .......... *G06F 16/9535* (2019.01); *G06F 17/27* (2013.01); *G06F 21/64* (2013.01); *G06Q 30/0202* (2013.01); *G06Q 50/01* (2013.01)

(58) Field of Classification Search
CPC .. G06F 16/337; G06F 16/345; G06F 16/9535; G06F 21/64; G06F 21/31; G06K 9/00469; G06Q 10/10
USPC .......................................................... 707/811
See application file for complete search history.

(56) References Cited

U.S. PATENT DOCUMENTS

| | | | |
|---|---|---|---|
| 9,542,669 B1* | 1/2017 | Browning | G06Q 10/109 |
| 2006/0248076 A1 | 11/2006 | Troy et al. | |
| 2006/0271526 A1* | 11/2006 | Charnock | G06Q 30/02 |
| 2007/0265824 A1 | 11/2007 | Paradis | |
| 2011/0320373 A1* | 12/2011 | Lee | G06Q 50/01 705/319 |
| 2013/0104251 A1* | 4/2013 | Moore | G06F 21/602 726/30 |
| 2014/0164302 A1 | 6/2014 | DiFabbrizio et al. | |
| 2015/0046346 A1* | 2/2015 | Juola | G06F 21/31 705/310 |
| 2015/0066968 A1 | 3/2015 | Bastide et al. | |
| 2015/0142888 A1* | 5/2015 | Browning | H04L 12/1831 709/204 |

OTHER PUBLICATIONS

England, B. "A Rhetorical Analysis Approach to Natural Language Processing", Jan. 16, 2013.
Gollub, T et al, "Recent Trends in Digital Text Forensics and Its Evaluation Plagiarism Detection, Author Identification and Author Profiling", Jul. 17, 2013.
Mali, M.P. et al, "Author Identification System", Mar. 5, 2014.
Payer, M et al, "What you Submit is Who You Are: A Multi-Modal Approach for Deanonymizing Scientific Publications", Oct. 29, 2014.
Rong Zheng et al .. "A Framework for Authorship Identification of On! ine 1-15 Messages: Writing-Style Features and Classification Techniques." Journal of the American Society for Information Science and Technology.

* cited by examiner

AUTHOR IDENTIFICATION BASED ON FUNCTIONAL SUMMARIZATION

BACKGROUND

Robust systems may be built by utilizing complementary, often largely independent, machine intelligence approaches, such as functional uses of the output of multiple summarizations and meta-algorithmic patterns for combining these summarizers. Summarizers are computer-based applications that provide a summary of some type of content. Meta-algorithmic patterns are computer-based applications that can be applied to combine two or more summarizers, analysis algorithms, systems, or engines to yield meta-summaries. Functional summarization may be used for evaluative purposes and as a decision criterion for analytics, including author identification in a text content.

DETAILED DESCRIPTION

Figure 1:
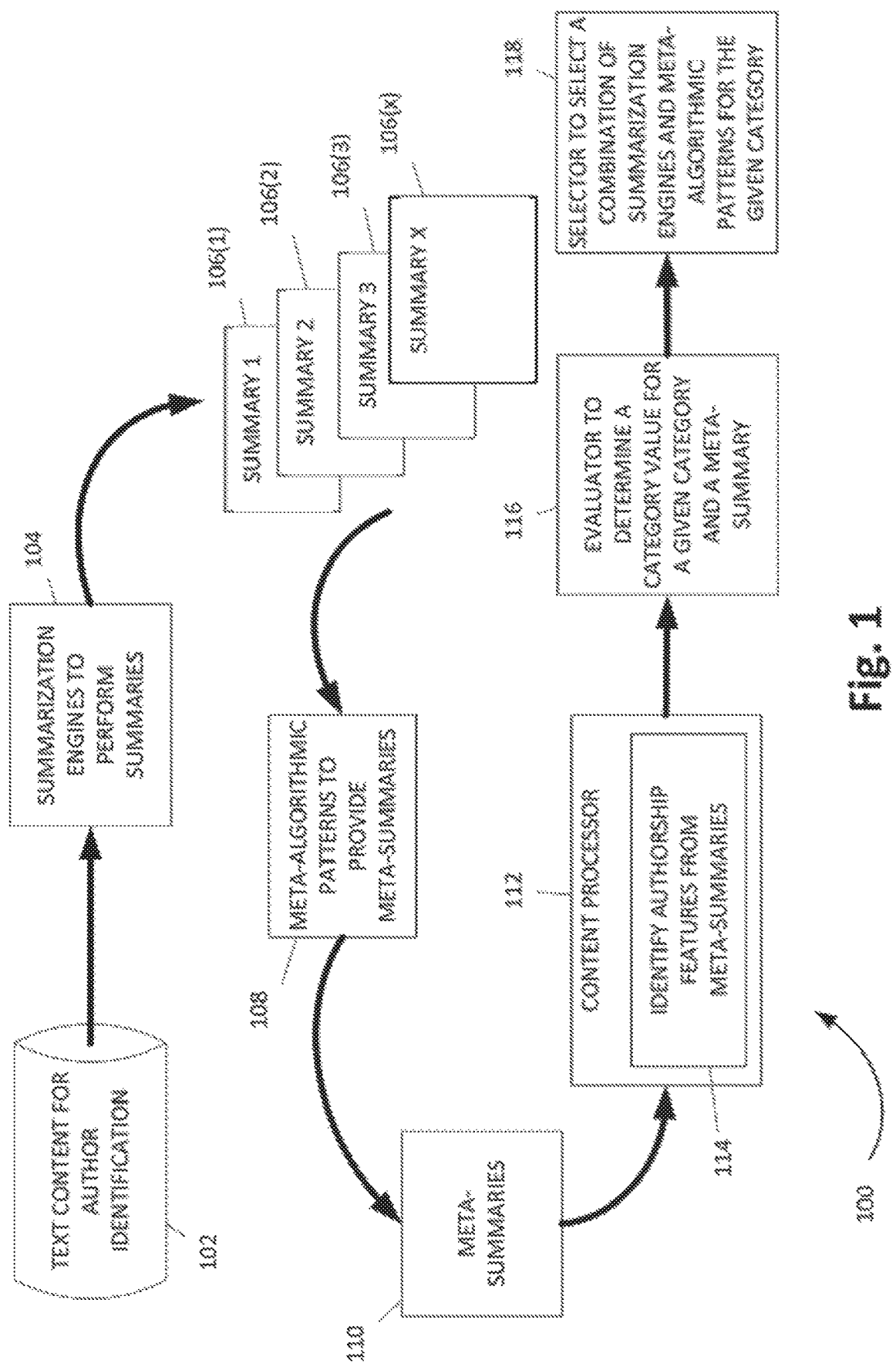
FIG. 1 is a functional block diagram illustrating one example of a system for author identification based on functional summarization.

Robust systems may be built by using complementary, often largely independent, machine intelligence approaches Text summarization is a well-known and mature means of generating intelligence, or "refined data", from a larger body of text. Summarization may be utilized as a decision criterion for text analytics, each with its own idiosyncrasies and specific elements.

Author identification based on functional summarization is disclosed. Author identification is useful for establishing precedence, determining possible plagiarism, uncovering cheating or other linguistic fraud, determining writing sophistication and suggesting similar reading for interested parties. As described herein, meta-algorithmic patterns of functional summarization may be utilized to perform author identification. As disclosed herein, multiple summarizers—as distinct summarizers or together in combination using meta-algorithmic patterns—may be utilized for author identification.

Generally, author identification is performed with stylometry and forensic linguistics, for example, with existing software systems including "signature", "JGAAP", "stylo" and "stylene" for Dutch language. Such approaches are typically based on "writer invariants" in terms of word choice, "rare pairs collocations", and training based on, for example, bag of words approaches, and learning algorithms such as genetic algorithms ("GA's") and artificial neural networks ("ANN's"). Such systems generally depend on a selection of features 114 related to authorship and generally do not scale well with additions of new authors, new authorship features, new summarization engines, and so forth.

As described in various examples herein, functional summarization is performed with combinations of summarization engines and/or meta-algorithmic patterns. A summarization engine is a computer-based application that receives a text content and provides a summary of the text content. The text content may be non-textual, in which case appropriate techniques may be utilized to convert the non-textual text content into a textual text content prior to application of functional summarization. A meta-algorithmic patterns is a computer-based application that can be applied to combine two or more summarizers, analysis algorithms, systems, and/or engines to yield meta-summaries. In one example, multiple meta-algorithmic patterns may be applied to combine multiple summarization engines in a plurality of patterns/ways.

Functional summarization utilizes multiple summarization engines to reduce a set of text down to a more relevant set for a given text analytics tasks. When extractive summarization is used, it may offer many advantages to author identification. This is because the extractive summarizers may be highly likely to capture important expressions that acutely differentiate the/a style of an author. This in turn is because rare terms and collocations are rarer than common terms and collocations. Accordingly, for most extractive summarization engines, rare terms and collocations may be more heavily weighted in functional summarization, and are therefore more likely to be part of a summarized output.

A different level of "compression", measured as a ratio of a length of an original text to a length of an associated summary, may be utilized for different broad classes of text. For example, fiction may be compressed relatively less than non-fiction to ensure that prose and/or poetic phrases may be largely preserved in the summaries.

Functional summarization may be applied for author identification in a text content. For example, a summary of a given text content may be compared to summaries available in a corpus of text content to identify summaries that are most similar to the summary of the given text content, and authors associated with similar summaries may be associated with the given text content.

As described herein, meta-algorithmic patterns are themselves pattern-defined combinations of two or more summarization engines, analysis algorithms, systems, or engines; accordingly, they are generally robust to new samples and are able to fine tune personalization of a learning environment to a learner's ability, goal, and/or needs. As described herein, four meta-algorithmic approaches may be utilized to provide author identification through a variety of methods, including (a) Predictive Selection Pattern; (b) Tessellation and Recombination; (c) confusion Matrix with Expert Decisioner, and (d) Tessellation and Recombination with Expert Decisioner. Both primary identification (e.g., classifying amongst a known, usually large, set of authors) and secondary identification (e.g., determining among a paired set of authors) may be supported.

The functional summarizations described herein are generally more adaptive, robust and, after training, accurate than traditional single-stylometry approach engines. For example, because comparisons of authorship features are made on summaries of the text, the system typically scales well with larger and larger numbers of authors and documents. Also, for example, because extractive summarization engines tend to emphasize rare, words, terms, and term combinations in their output, summarization may be effective for targeting author-identifying text. As another example, the approaches described herein are language-independent, scalable and work with mixed language text content. For example, a Dostoevsky novel with a mixture of English and French may be suitably processed.

As described herein, a set of author identification patterns may utilize a tunable set of summarization engines to "digest" text and allow identification of an author through a variety of means. Because of a plurality of extractive summarization settings and approaches, along with four meta-algorithmic patterns for using the output of the summarizers, the system may be adaptive to different types of authors. For example, the system may classify and/or identify bloggers, fiction writers, tech writers, non-fiction writers, critics, patent attorneys, and so forth.

As described in various examples herein, author identification based on functional summarization is disclosed. One example is a system including a plurality of summarization engines, each summarization engine to receive, via a processing system, a text content to provide a summary of the text content. At least one meta-algorithmic pattern is applied to at least two summaries to provide a meta-summary of the text content using the at least two summaries. A content processor identifies, from the meta-summary, authorship features associated with the text content. An evaluator determines, for a given category, a category value of the meta-summary, the category value indicative of a similarity of the authorship features to the category. A selector selects, for the given category, a combination of meta-algorithmic patterns and summarization engines that provides the meta-summary that optimizes the category value for the text content.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

FIG. 1 is a functional block diagram illustrating one example of a system 100 for author identification based on functional summarization. System 100 applies a plurality of summarization engines 104, each summarization engine to receive, via a processing system, a text content 102 to provide a summary of the text content 102. The summaries (e.g., Summary 1 106(1), Summary 2 106(2), ..., Summary X 106(x)) may be further processed by at least one meta-algorithmic pattern 108 to be applied to at least two summaries to provide a meta-summary 110 of the text content 102 using the at least two summaries.

Meta-summaries 110 are summarizations created by the intelligent combination of two or more standard or primary summaries. The intelligent combination of multiple intelligent algorithms, systems, or engines is termed "meta-algorithmics", and first-order, second-order, and third-order patterns for meta-algorithmics may be defined.

System 100 may receive a text content 102 to provide a summary of the text content 102. System 100 further includes a content processor 112, an evaluator 116, and a selector 118. The text content 102 may include textual and/or non-textual content. Generally, the text content 102 may include any material for which author identification may need to be performed. In one example, the text content 102 may include material related to a subject such as Literature. In one example, a subject may further include a plurality of topics. For example, Literature may include a plurality of topics such as Fiction, Non-fiction, Poetry, Elizabethan, Victorian, Edwardian, and so forth.

Non-textual content may include an image, audio and/or video content. Video content may include one video, portions of a video, a plurality of videos, and so forth. In one example, the non-textual content may be converted to provide a plurality of tokens suitable for processing by summarization engines 104.

The summary of the text content 102 (e.g., Summary 1 106(1), Summary 2 106(2), ..., Summary X 106(x)) may be one of an extractive summary and an abstractive summary. Generally, an extractive summary is based on an extract of the text content 102, and an abstractive summary is based on semantics of the text content 102. In some examples, the summaries may be a mix of extractive and abstractive summaries. A plurality of summarization engines 104 may be utilized to create summaries (e.g., Summary 1 106(1), Summary 2 106(2), ..., Summary X 106(x)) of the text content 102.

The summaries may include at least one of the following summarization outputs:
(1) a set of key words;
(2) a set of key phrases;
(3) a set of key images;
(4) asset of key audio;
(5) an extractive set of clauses;
(6) an extractive set of sentences;
(7) an extractive set of video clips;
(8) an extractive set of clustered sentences, paragraphs and other text chunks;
(9) an abstractive, or semantic, summarization.

In other examples, a summarization engine may provide a summary including another suitable summarization output. Different statistical language processing ("SLP") and natural language processing ("NLP") techniques may be used to generate the summaries. For example, a textual transcript of a video may be utilized to provide a summary.

In some examples, the at least one meta-algorithmic pattern 108 is a Predictive Selection Pattern, Tessellation and Recombination Pattern, Tessellation and Recombination Pattern with an Expert Decisioner, and a Confusion Matrix Pattern with an Expert Decisioner. Such patterns are further described in detail herein.

System 100 includes a content processor 112 to identify, from the meta-summary 110, authorship features 114 associated with the text content 102. Authorship features 114 may include a style of an author, a literary period associated with the author, frequent words and phrases utilized by the author, additional authors contemporaneous with the author, personal attributes associated with the author, and so forth.

System 100 includes an evaluator 116 to determine, for a given category, a category value of the meta-summary 110, the category value indicative of a similarity of the authorship features 114 to the category. For example, the category may be a literary period, and the category value may be indicative of how similar the content of the meta-summary 110 is to the features 114 associated with the literary period. For example, a category value for a meta-summary 110 with many Shakespearean words and phrases will be higher for the category "Shakespearean period" than for the category "Early Renaissance".

System 100 includes a selector 118 to select, for the given category, a combination of meta-algorithmic patterns and summarization engines that provides the meta-summary that optimizes the category value for the text content. In some examples, selector 118 may select the combination of meta-algorithmic patterns and summarization engines that provides the meta-summary 110 that maximizes the category value for the text content 102.

In some examples, the at least one mete-algorithmic pattern 108 is a Predictive Selection Pattern, and the evaluator 116 further determines a summarizer ranking matrix indicative of a confidence in the selected combination of the meta-algorithmic patterns and the summarization engines Predictive Selection Pattern may be generally utilized for large, multi-style, multi-genre text corpora including a multiplicity of authors. It scales well, since new categories of text may be added with minimal change in processing.

In some examples, the Predictive Selection Pattern may employ topic identification as a specific category from which to segment an overall "text space". The topic that the text content 102 is assigned to is the specific category (subset of the input space) to which a given text content 102 is assigned. Within this category, the best summarizer may be determined to, be the one that provides the highest accuracy for that category.

Training set data may often be used to define classification categories, and for each category, to rank the summarizers based on their performance. Such performance data may be collected into a summarizer ranking matrix. The summarizer ranking matrix may allow accurate association of text content 102 with a category (or subset), called a categorization process, or a statistical learning phase. Accordingly, when a new text content is to be processed in a run-time phase, its category may first be determined, and then the best performing summarizer or meta-algorithmic summarizer (e.g., a combination of summarizers) for that category may be selected for the run-time phase.

For example, the text content 102 may include a large number of Shakespearean words and/or phrases. The Predictive Selection Pattern may identify a time period associated with such text content 102, and further identify a combination of summarization engines and/or meta-algorithmic patterns that is an appropriate classifier for the identified time period.

Also, for example, the text content 102 may include a large number of words and/or phrases indicative of social networking. For example, a number of characters may indicate that the text content 102 relates to a social networking feed. Also, for example, presence of emoticons, and/or terms such as "LOL", "cu", "2day", and so forth may indicate that the text content 102 is generated by an instant messaging system. The Predictive Selection Pattern may identify a messaging system associated with such text content 102, and may further identify a combination of summarization engines and/or meta-algorithmic patterns that is an appropriate classifier for the identified messaging system.

Figure 2:
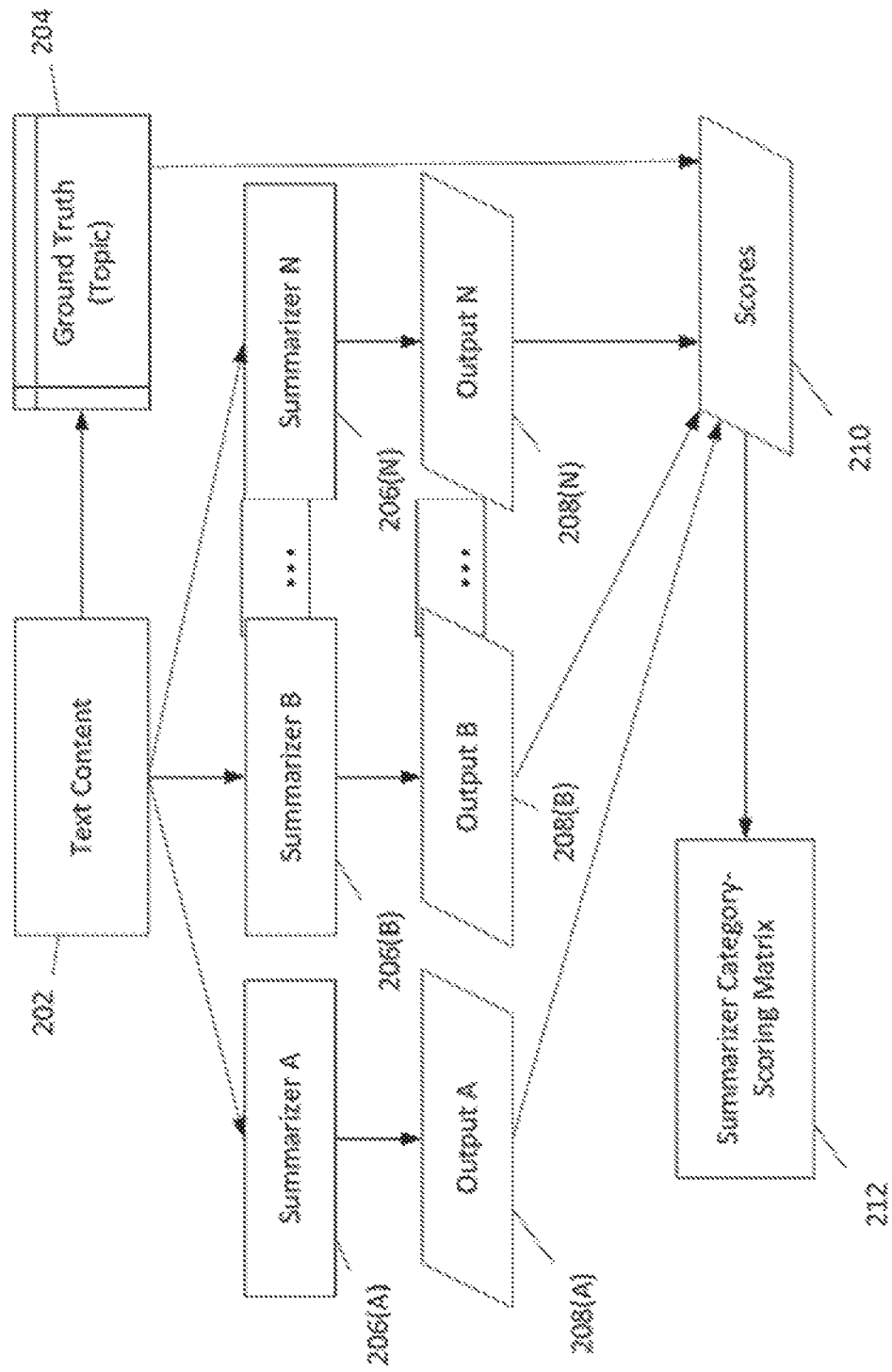
FIG. 2 is a flow diagram illustrating one example of a learning phase for a Predictive Selection Pattern for author identification based on functional summarization.

FIG. 2 is a flow diagram illustrating one example of a learning phase for a Predictive Selection Pattern for author identification based on functional summarization. At 202, text content for author identification may be received. At 204, ground truth, indicative of topics and/or categories associated with the text content, may be identified. At 210, category scores may be determined based on the ground truth.

In some example, a plurality of summarizers may be applied to the text content to generate a plurality of summaries of the text content. For example, Summarizer A may be applied at 206(A) to generate an Output A at 208(A). Likewise, Summarizer B may be applied at 206(B) to generate an Output B at 208(B), and so forth. For example, Summarizer N may be applied at 206(N) to generate an Output N at 208(N).

At 210, category scores may be determined for each output. The category score may be a direct match or a predictive match for the summary of the text content. In some examples, the category score may be an affinity score indicative of an affinity for an email system, an affinity for a social networking system, an affinity for an instant messaging system, and so forth.

At 212, a summarizer category scoring matrix may be generated. In some examples, rows of the summarizer category scoring matrix may represent combinations of summarization engines and/or meta-algorithmic patterns, whereas columns may represent categories. Each entry in the summarizer category scoring matrix represents a probability of a combination's relevance to a category.

In some examples, the at least one meta-algorithmic pattern 108 is a run-time phase of a Predictive Selection Pattern, and the content processor 112 may further receive additional text content, and identify an additional category for the additional text content. The selector 118 may further select an additional combination of meta-algorithmic patterns and summarization engines based on the additional category and the summarizer-category scoring matrix. The selected additional combination of meta-algorithmic patterns and summarization engines may be applied to the additional text content to generate an additional meta-summary 110, and authorship features 114 of the additional meta-summary 110 may be provided via a computing device.

Figure 3:
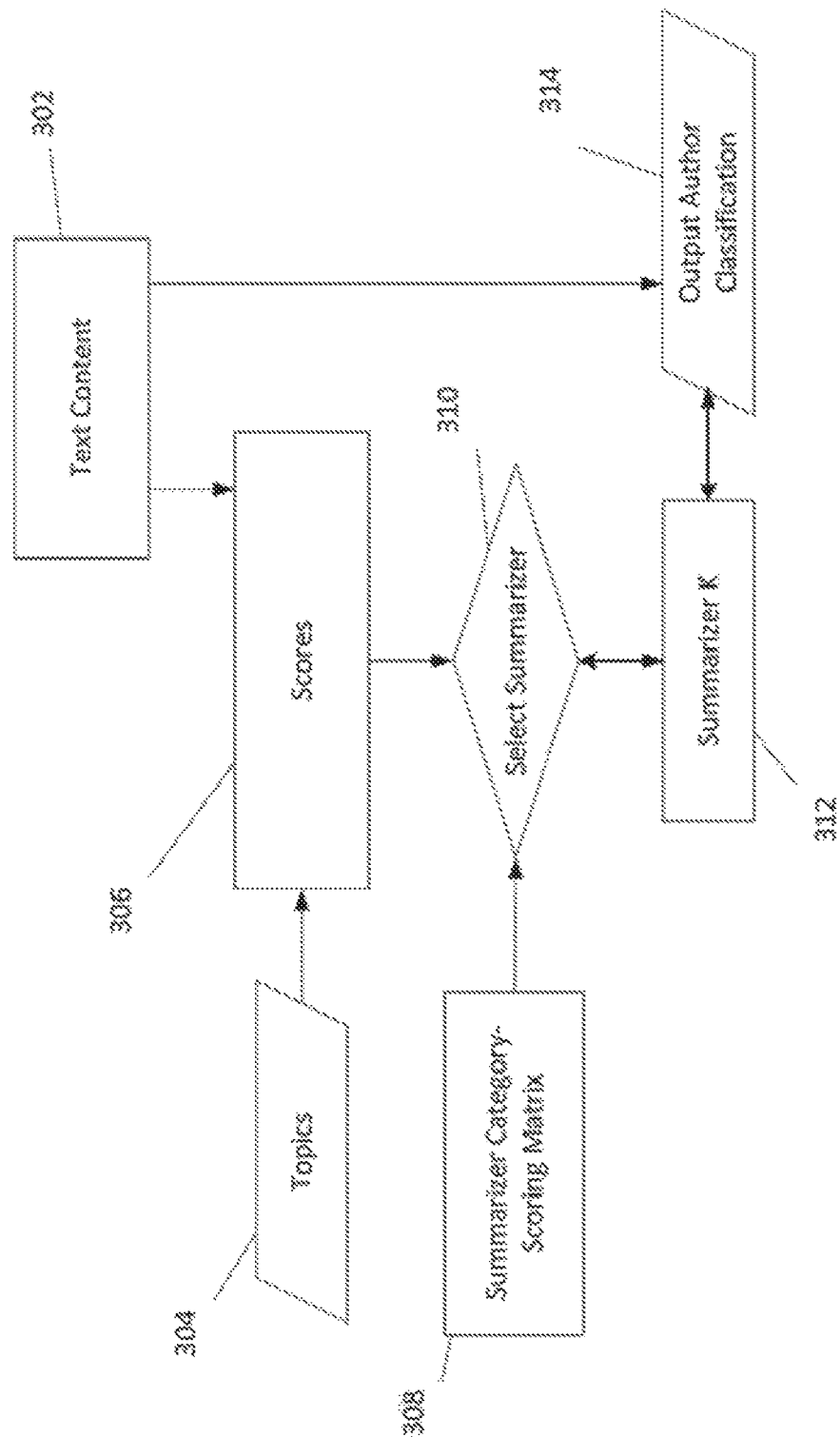
FIG. 3 is a flow diagram illustrating one example of a run-time phase for a Predictive Selection Pattern for author identification based on functional summarization.

FIG. 3 is a flow diagram illustrating one example of a run-time phase for a Predictive Selection Pattern for author identification based on functional summarization. At 302, an additional text content may be received. At 304, topics and/or categories may be accessed from a repository of topics/categories. At 306, scores may be associated with each of the topics/categories. At 308, the summarizer-category scoring matrix may be accessed, for example, from a database. At 310, an additional category may be identified for the additional text content based on the scores, and an additional combination of meta-algorithmic patterns and summarization engines may be selected based on the additional category and the summarizer-category scoring matrix. At 312, Summarizer K may be selected. At 314, Summarizer K may be applied to the additional text content to generate an additional meta-summary. An author classification may be provided based on the additional meta-summary.

Referring again to FIG. 1, in some examples, the at least one meta-algorithmic pattern 108 is a Tessellation and Recombination Pattern, and the tessellation may include determining word frequencies of words in the at least two summaries, and the recombination may include recombinations of words in the in the at least two summaries. Tessellation may involve breaking the text content 102 down into word frequencies. In some examples, the word frequencies may be normalized for their relative occurrence within a large corpus of text, and the Tessellation and Recombination Pattern may be similar to the Vector Space Model ("VSM").

In some examples, after a tessellation is determined, the recombination may be a filtered version of the tessellation. For example, words with relatively low frequencies may be filtered, and the filtered-VSM may be re-normalized. The Tessellation and Recombination Pattern may be particularly effective for differentiating between two authors, and may be utilized for validating a speculated author or for establishing an occurrence of plagiarism. In some examples, such an approach may not scale well to a multiplicity of authors and/or topics since the tessellation is essentially on a "bag of words" basis. Nevertheless, the summarizers may functionally select for rarer terms than use the entire text content 102, and so this method may be performed for enhanced accuracy.

In some examples, the evaluator 116 may determine category scores category scores for the recombinations of words in the at least two summaries. The selector 118 may select the combination of meta-algorithmic patterns and summarization engines based on the category scores.

In some examples, a second text content may be received, the Tessellation and Recombination Pattern may be applied to generate an additional plurality of recombinations (or second meta-summaries). The evaluator 116 may determine category scores for such additional plurality of recombinations. In some examples, the content processor 112 may further identify common authorship features by comparing respective category values of the meta-summary 110 and the second meta-summary. For example, common authorship features may be identified by comparing respective category values of the additional plurality of recombinations with known recombinations.

Figure 4:
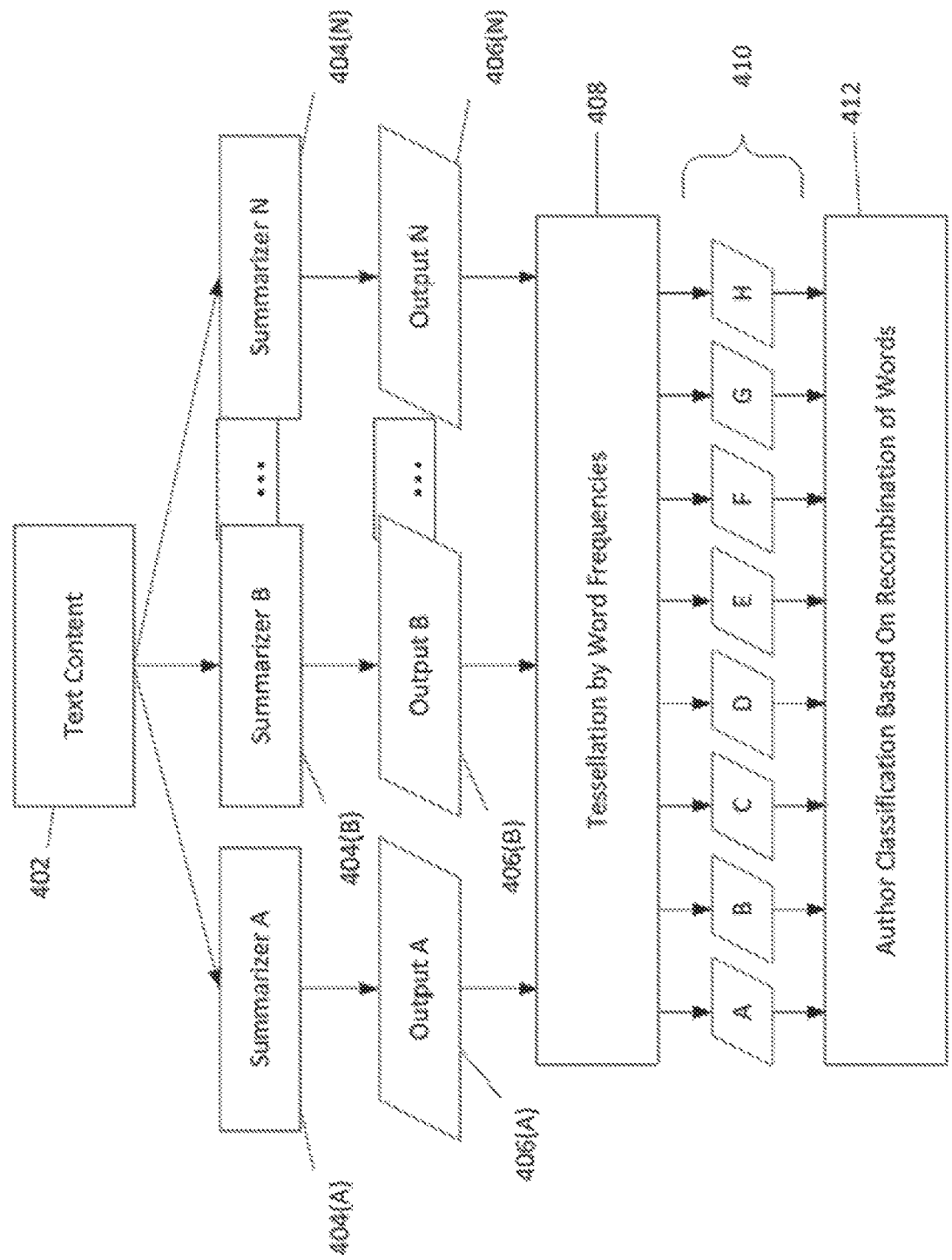
FIG. 4 is a flow diagram illustrating one example of a Tessellation and Recombination Pattern for author identification based on functional summarization.

FIG. 4 is a flow diagram illustrating one example of a Tessellation and Recombination Pattern for author identification based on functional summarization. At 402, text content is received. In some example, a plurality of summarizers may be applied to the text content to generate a plurality of summaries of the text content. For example, Summarizer A may be applied, at 404(A) to generate an Output A at 406(A). Likewise, Summarizer B may be applied at 404(B) to generate an Output B at 406(B), and so forth. For example. Summarizer N may be applied at 404(N) to generate an Output N at 406(N). At 408, a tessellation may be performed based on word frequencies. For example, if a first author uses "but" frequently and a second author uses "however" frequently, then such frequencies may be utilized to differentiate between the first and second authors.

At 410, a filtered version of the tessellation may be extracted to generate a plurality of recombinations, A, B, . . . , H. At 412, author classification based on the recombinations A, B, . . . , H may be performed. In some examples, category scores may be determined for the plurality of recombinations, A, B, . . . , H. For example, a second plurality of recombinations, A', B', . . . , H' may be identified for a second text content, and differences of category scores for pairs, for example, $\delta_A = A - A'$, $\delta_B = B - B'$, and so forth may be determined. Authorship of two text contents may be determined to be the same if, for example, $\delta_A$, $\delta_B$, and so forth, are less than a threshold. In some examples, different thresholds may be used for A, B, etc.

Referring again to FIG. 1, in some examples, the at least one meta-algorithmic pattern 108 is a Tessellation and Recombination Pattern with an Expert Decisioner, and the tessellation may include rare combinations of words in the at least two summaries, and the recombination may include patterns derived from such rare combinations. The Tessellation step of the Tessellation and Recombination Pattern with an Expert Decisioner is different from that of the Tessellation and Recombination Pattern. In some examples, the text content 102 may be extracted and arranged into a set of rare combinations defined as regular expressions. Some examples of such "tessellation primitives" may be "Word A occurs twice and word B once in close proximity", "Word A and B occur in close proximity", and "Word A and Word B, but not Word C, occur in close proximity". A typical language may include thousands of words. Accordingly, there may be a plurality of such tessellation primitives. However, patterns may be easily generated, and values for A, B, and C may be selected from a pool of most relatively rare terms, or just from an extractive summarization of the text content 102. In some examples, functional summarization reduces the number of regular expressions.

The Recombination step of the Tessellation and Recombination Pattern with an Expert Decisioner may search for a given set of such tessellation primitives that best indicate a given author. Such an approach may be scalable and may be made topic-specific, genre-specific. In some examples, such an approach may be designed to be robust to misspellings and spelling variants.

Figure 5:
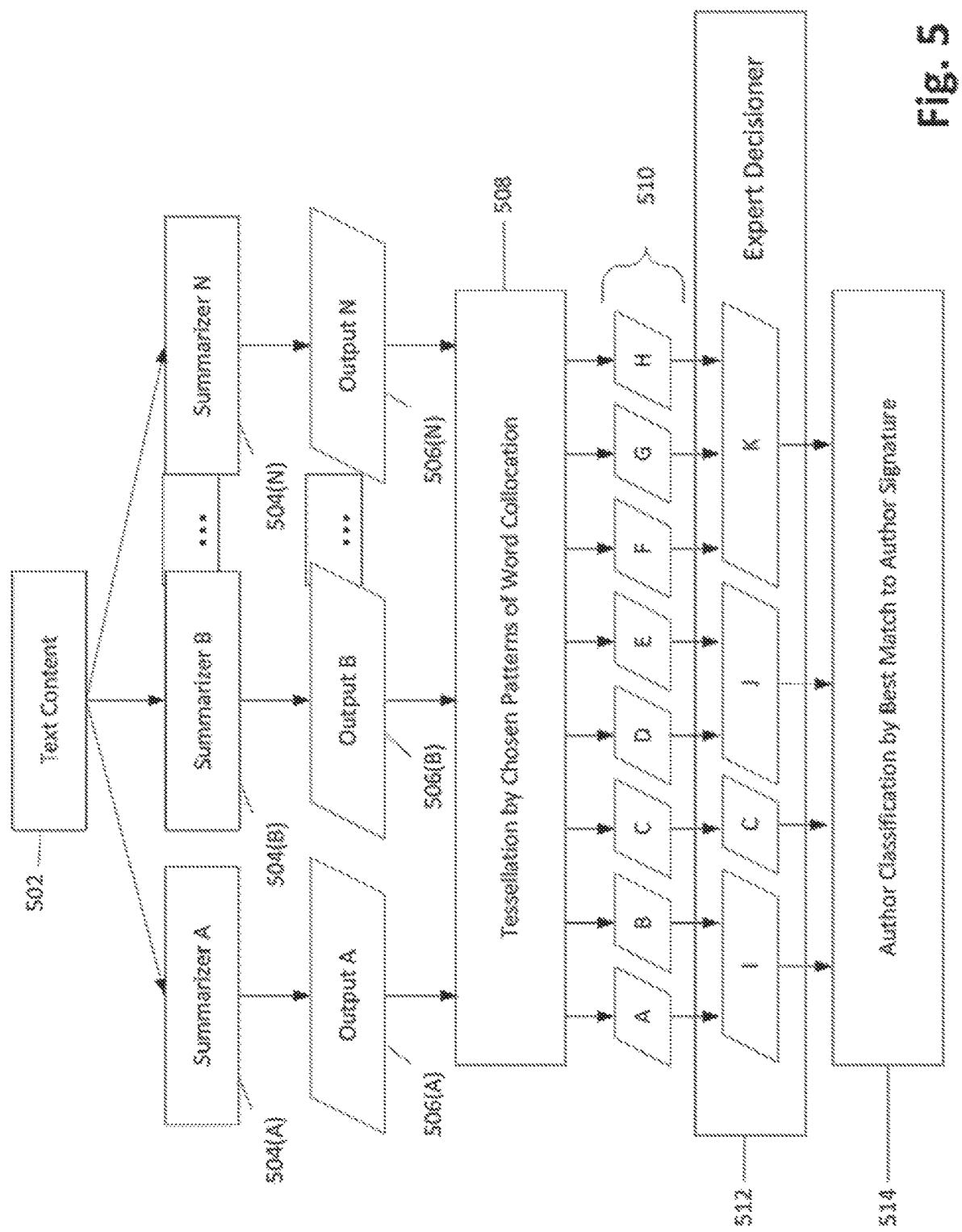
FIG. 5 is a flow diagram illustrating one example of a Tessellation and Recombination Pattern with an Expert Decisioner for author identification based on functional summarization.

FIG. 5 is a flow diagram illustrating one example of a Tessellation and Recombination Pattern with an Expert Decisioner for author identification based on functional summarization. At 502, text content is received. In some example, a plurality of summarizers may be applied to the text content to generate a plurality of summaries of the text content. For example, Summarizer A may be applied at 504(A) to generate an Output A at 506(A). Likewise, Summarizer B may be applied at 504(B) to generate an Output B at 506(B), and so forth. For example, Summarizer N may be applied at 504(N) to generate an Output N at 506(N). At 508, a tessellation may be performed based on chosen patterns of word collocations.

At 510, tessellation primitives, A, B, . . . , H, may be generated. For example, the tessellation primitives may be "Word A occurs twice and word B once in close proximity", "Word A and B occur in dose proximity", "Word A and Word B, but not Word C, occur in dose proximity", "Word A occurs twice, Word B occurs once, but Word C not at all, in close proximity", "Word A occurs before Word B in close proximity", "Word A occurs before Word B before Word C close proximity", and so forth. For example, in Shakespearean prose, the term "wouldst" may be frequently followed in close proximity by the term "wherefore".

At 512, an expert decisioner searches for a given combination of tessellation primitives, A, B, . . . , H that may best indicate a given author. For example, "I" may be indicative of an occurrence of the tessellation primitives A and B. Also, for example, "J" may be indicative of an occurrence of the tessellation primitives D and I, and so forth. Generally, patterns of words and usages may be identified. For example, patterns for "nevertheless", "however", "but", etc. may be identified based on various combinations.

At 514, author classification and/or identification may be performed based on a best match with the outputs of the expert decisioner. For example, a second plurality of recombinations, I', C', J', and K' may be identified for a second text content, and differences of category scores for pairs, for example, $\delta_I$=I–I', $\delta_C$=C–C', and so forth may be determined. Authorship of two text contents may be determined to be the same if, for example, $\delta_I$, $\delta_C$, and so forth, are less than a threshold. In some examples, different thresholds may be used for I, C, etc.

Referring again to FIG. 1, in some examples, the at least one meta-algorithmic pattern 108 is a Confusion Matrix Pattern with an Expert Decisioner, and wherein the content processor 112 may further generate a training data author confusion matrix, where an entry in row i and column j is indicative of a probability of incorrectly assigning the text content 102 to author j instead of author i. Generally, the confusion matrix is an N×N matrix that illustrates the misclassifications among N classes of input, in this case, N authors.

In some examples, a high confusion in authorship features for a collection of authors may be identified based on the author confusion matrix, and the at least one meta-algorithmic pattern 108 may include a second meta-algorithmic patterns to identify a likely author of the collection of authors. For example, the confusion matrix may be automatically mined to find the highest "confusion" among a collection of authors, and in cases where the upfront (highly scalable) classifier assigns the text to an author of the collection of authors, the system may then deploy a more accurate author classification to differentiate among the authors in the collection of authors. For example, the Tessellation and Recombination Pattern may be utilized for further classification within the identified collection of authors. In some examples, the collection of authors may comprise two authors, and the second meta-algorithmic patterns 108 may be a Tessellation and Recombination Pattern to identify a likely author of the two authors.

In some examples, the author confusion matrix may be modified by aggregating entries of rows and columns associated with the collection of authors, and the Confusion Matrix Pattern with an Expert Decisioner may be iteratively applied to the modified author confusion matrix. For example, if a confusion is identified between Author i and Author j, then the entries $C_{ij}$ and $C_{ji}$ may be aggregated in the N×N matrix to generate an (N–1)×(N–1) matrix.

Accordingly, the Confusion Matrix Pattern with an Expert Decisioner is a "hybrid" meta-algorithmic patterns that uses one meta-algorithmic patterns (e.g., Predictive Selection Pattern) to hone in on a single author or cluster or related authors; and then a second pattern to determine which specific author from the duster is the true author. Such "successive honing in" is very efficient from a performance standpoint, and highly accurate.

Figure 6:
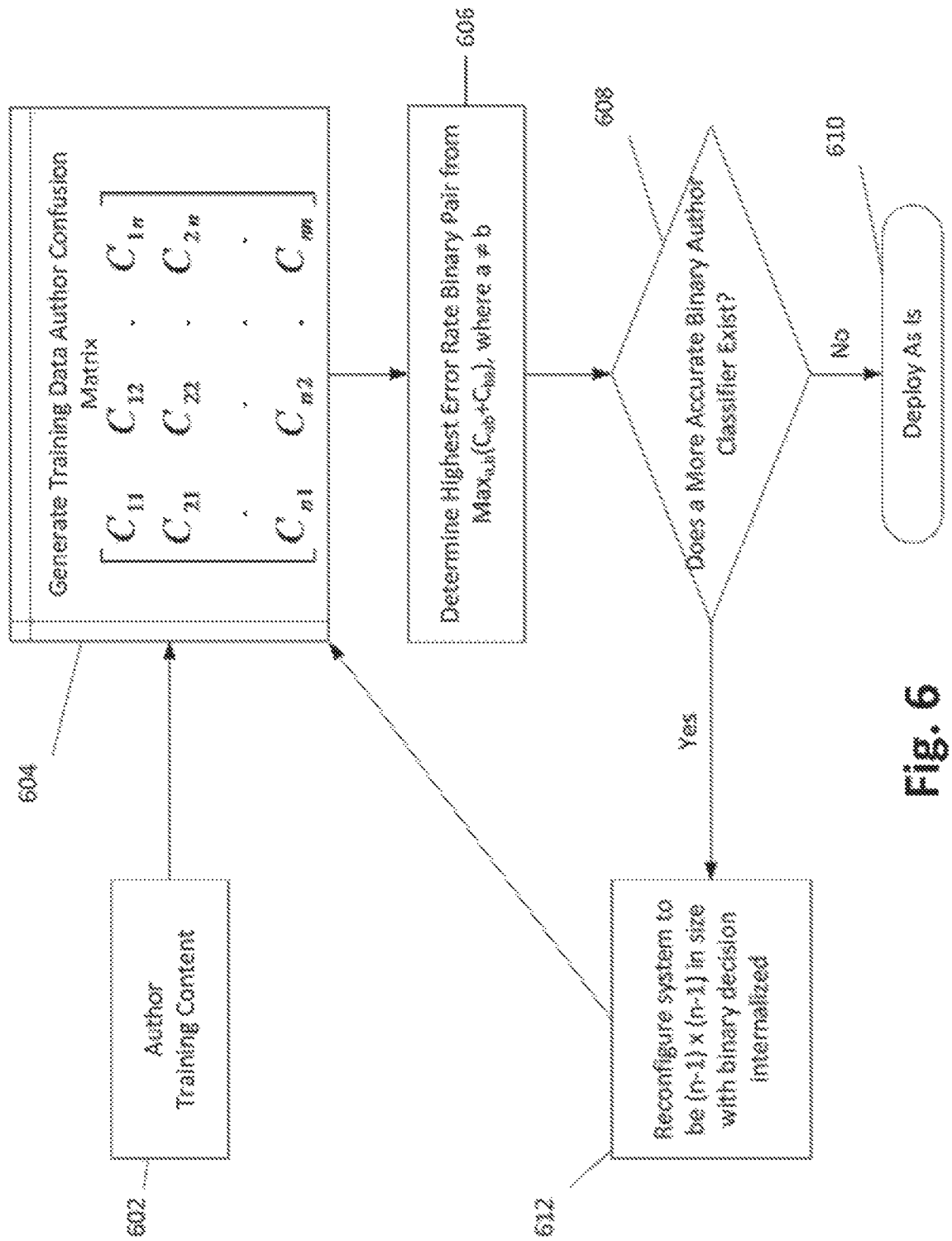
FIG. 6 is a flow diagram illustrating one example of a Confusion Matrix Pattern with an Expert Decisioner for author identification based on functional summarization.

FIG. 6 is a flow diagram illustrating one example of a Confusion Matrix Pattern with an Expert Decisioner for author identification based on functional summarization. At 602, author training content is received. At 604, a training data author confusion matrix is generated. At 606, a highest error rate binary pair m, n may be selected based on determining $C_{mn}+C_{nm}=\text{Max}_{a,b}(C_{ab}+C_{ba})$, where a≠b, and $C_{ij}$ is an ij-th entry in the author confusion matrix. At 608, it may be determined if a more accurate classifier may be utilized to distinguish between authors m and n. If not, then at 610, the selected combination of summarization engines and meta-summaries may be utilized. If yes, then at 612, the entries $C_{mn}$ and $C_{nm}$ may be aggregated in the N×N author confusion matrix to generate an (N–1)×(N–1) reconfigured author confusion matrix. At 604, the flow repeats with the (N–1)×(N–1) reconfigured author confusion matrix.

Referring again to FIG. 1, in some examples, the selector 118 may further receive user input via an interactive graphical user interface, where the user input may be related to addition of a summarization engine, and selection of a new combination of summarization engines 104 and meta-algorithmic patterns for deployment. In some examples, the selector 118 may further select the authorship features 114 by receiving input via the interactive graphical user interface. For example, a user may input authorship features 114 and associate the text content 102 with the authorship features 114.

In some examples, an additional summarization engine may be added and the selector 118 may further select, for deployment, a second combination of meta-algorithmic patterns including the additional summarization engine, where the selection may be based on, optimizing category values. For example, based on a combination of summarization engines, and meta-algorithmic patterns, a user may select authorship features that were not previously represented in a collection of features, and the combination of summarization engines and meta-algorithmic patterns that generated the summary and/or meta-summary may be automatically added for deployment by system 100. In some examples, the user may input a choice of a combination of summarization engines and meta-algorithmic patterns to be applied to the text content 102.

The components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated visualization function.

For example, each summarization engine may be a combination of hardware and programming for performing a designated summary. For example, a first summarization engine may include programming to generate an extractive summary, whereas a second summarization engine may include programming to generate an abstractive summary. Each summarization engine may include hardware to physically store the summaries, and processors to physically process the text content 102 and determine the summaries. Also, for example, each summarization engine may include software programming to dynamically interact with the other components of system 100.

Likewise, the content processor 112 may be a combination of hardware and programming for performing a designated function. For example, content processor 112 may include programming to identify, from the meta-summaries, authorship features 114 associated with the text content 102. Content processor 112 may include hardware to physically store the identified authorship features 114. Likewise, evaluator 116 may include programming to evaluate category values, and selector 118 may include programming to select a combination of summarization engines and meta-algorithmic patterns.

Generally, the components of system 100 may include programming and/or physical networks to be communicatively linked to other components of system 100. In some instances, the components of system 100 may include a processor and a memory, while programming code is stored and on that memory and executable by a processor to perform designated functions.

Generally, interactive graphical user interfaces may be provided via computing devices. A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 7:
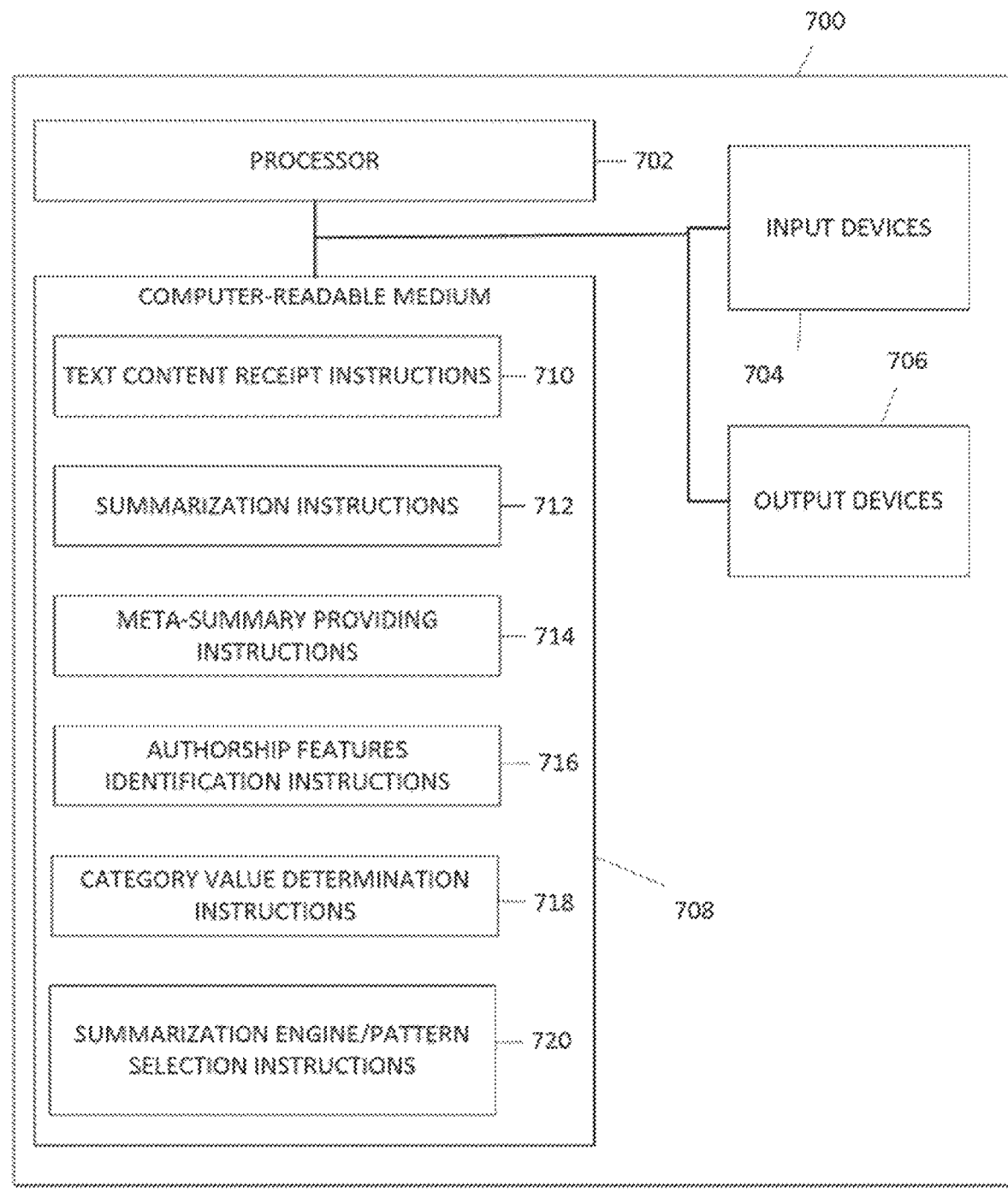
FIG. 7 is a block diagram illustrating one example of a computer readable medium for author identification based on functional summarization.

FIG. 7 is a block diagram illustrating one example of a computer readable medium for author identification based on functional summarization. Processing system 700 includes a processor 702, a computer readable medium 708, input devices 704, and output devices 706. Processor 702, computer readable medium 708, input devices 704, and output devices 706 are coupled to each other through a communication link (e.g., a bus).

Processor 702 executes instructions included in the computer readable medium 708. Computer readable medium 708 includes text content receipt instructions 710 to receive, via a computing device, a text content for author identification.

Computer readable medium 708 includes summarization instructions 712 to apply a plurality of summarization engines, each summarization engine to provide a summary of the text content.

Computer readable medium 708 includes meta-summary providing instructions 714 to provide a meta-summary of the text content using at least two summaries by applying at least one of a Predictive Selection Pattern, Tessellation and Recombination Pattern, Tessellation and Recombination Pattern with an Expert Decisioner, and a Confusion Matrix Pattern with an Expert Decisioner.

Computer readable medium 708 includes authorship features identification instructions 716 to identify, from the meta-summary, authorship features associated with the text content.

Computer readable medium 708 includes category value determination instructions 718 to determine, for a given category, a category value of the meta-summary, the category value indicative of a similarity of the authorship features to the category.

Computer readable medium 708 includes summarization engine/pattern selection instructions 720 to select, for the given category, a combination of patterns and summarization engines that provides the meta-summary that optimizes the category value for the text content.

Input devices 704 include a keyboard, mouse, data ports, and/or other suitable devices for inputting information into processing system 700. In some examples, input devices 704, such as a computing device, are used by the interaction processor to receive user input for author identification. Output devices 706 include a monitor, speakers, data ports, and/or other suitable devices for outputting information from processing system 700. In some examples, output devices 706 are used to provide meta-summaries.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 708 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 700 are identified and refer to a combination of hardware and programming configured to perform a designated visualization function. As illustrated in FIG. 7, the programming may be processor executable instructions stored n tangible computer readable medium 708, and the hardware may include processor 702 for executing those instructions. Thus, computer readable medium 708 may store program instructions that, when executed by processor 702, implement the various components of the processing system 700.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 708 may be any of a number of memory components capable of storing instructions that can be executed by Processor 702. Computer readable medium 708 may be non-transitory in the sense that it does not encompass a transitory signal but instead is made up of one or more memory components configured to store the relevant instructions. Computer readable medium 708 may be implemented in a single device or distributed across devices. Likewise, processor 702 represents any number of processors capable of executing instructions stored by computer readable medium 708. Processor 702 may be integrated in a single device or distributed across devices. Further, computer readable medium 708 may be fully, or partially integrated in the same device as processor 702 (as illustrated), or it may be separate but accessible to that device and processor 702. In some examples, computer readable medium 708 may be a machine-readable storage medium.

Figure 8:
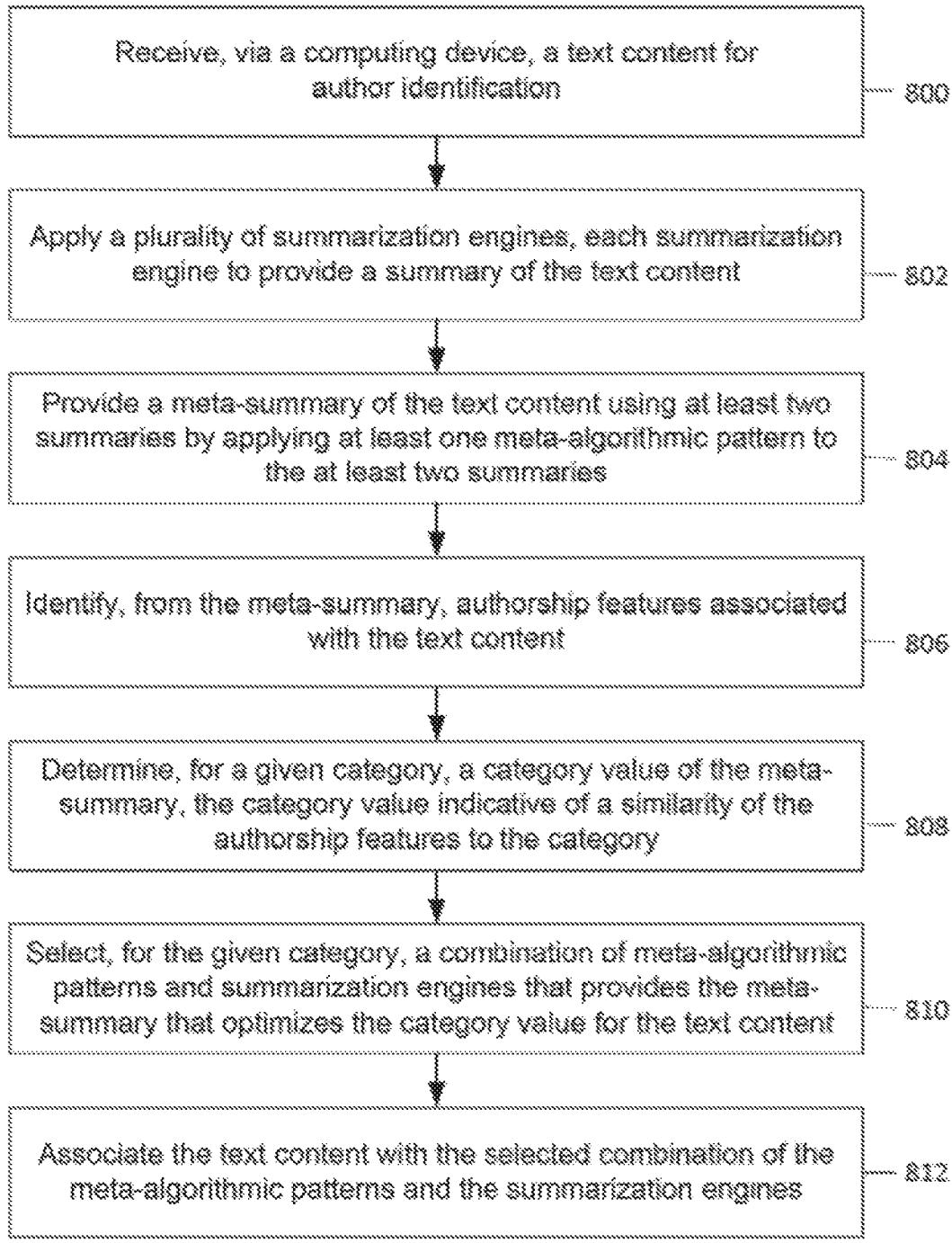
FIG. 8 is a flow diagram illustrating one example of a method for author identification based on functional summarization.

FIG. 8 is a flow diagram illustrating one example of a method for author identification based on functional summarization.

At 800, a text content for author identification may be received via a computing device.

At 802, a plurality of summarization engines may be applied to provide a summary of the text content.

At 804, at least one meta-summary of the text content may be provided by applying at least, one meta-algorithmic pattern to, at least two summaries.

At 806, authorship features associated with the text content may be identified from the meta-summary.

At 808, a category value of the meta-summary may be determined for a given category, the category value indicative of a similarity of the authorship features to the category.

At 810, a combination of meta algorithmic patterns and summarization engines that provides the meta-summary that optimizes the category value for the text content may be selected for the given category.

At 812, the text content may be associated with the selected combination of the meta-algorithmic patterns and the summarization engines.

Examples of the disclosure provide a generalized system for author identification based on functional summarization. The generalized system provides pattern-based, automatable approaches that are very readily deployed with a plurality of summarization engines. Relative performance of the summarization engines on a given set of text content may be dependent on a number of factors, including a number of topics, number of languages, a literary period, a number of text content per topic, coherency of the text content set, amount of specialization with the text content set, and so forth. The approaches described herein provide greater flexibility than a single approach, and utilizing the summaries rather than the original text content allows better identification of key words and phrases within the text content which may generally be more conducive to accurate author identification.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
a plurality of summarization engines, each summarization engine to receive, via a processing system, a text content to provide a summary of the text content;
a plurality of meta algorithmic patterns to be applied to at least two summaries to provide a meta-summary of the text content using the at least two summaries;
a content processor to identify, from the meta-summary, authorship features associated with the text content;
an evaluator to determine, for a given category, a category value of the meta-summary, wherein the category value is indicative of a similarity of the authorship features to the category; and
a selector to select, for the given category, a combination of one of the plurality of meta-algorithmic patterns and at least two of the plurality of summarization engines that provides the meta-summary that optimizes the category value for the text content that identifies an author to detect plagiarism or cheating.

2. The system of claim 1, wherein the plurality of meta algorithmic patterns include a Predictive Selection Pattern, and the evaluator is to further determine a summarizer ranking matrix indicative of a confidence in the combination of the meta-algorithmic patterns and the summarization engines that is selected.

3. The system of claim 2, wherein the evaluator is to further determine a summarizer-category scoring matrix with each entry indicative of a probability of relevance of the combination of meta-algorithmic patterns and summarization engines to a category.

4. The system of claim 3, wherein:
the content processor is to further:
receive additional text content, and
identify an additional category for the additional text content;

the selector is to further:
select an additional combination of meta-algorithmic patterns and summarization engines based on the additional category and the summarizer-category scoring matrix;
apply the additional combination of meta-algorithmic patterns and summarization engines that is selected to the additional text content to generate an additional meta-summary, and
provide, to a computing device, authorship features of the additional meta-summary.

5. The system of claim 1, wherein the plurality of meta algorithmic patterns include a Tessellation and Recombination Pattern, and wherein tessellation of the Tessellation and Recombination Pattern comprises determining word frequencies of words in the at least two summaries, and wherein recombination comprises recombinations of words in the at least two summaries.

6. The system of claim 5, wherein:
the selector is to further apply the combination of meta-algorithmic patterns and summarization engines that is selected to a second text content to generate a second meta-summary; and
the content processor is to further identify common authorship features by comparing respective category values of the meta-summary and the second meta-summary.

7. The system of claim 1, wherein the plurality of meta algorithmic patterns include a Tessellation and Recombination Pattern with an Expert Decisioner, and wherein tessellation of the Tessellation and Recombination Pattern with the Expert Decisioner comprises rare combinations of words in the at least two summaries, and wherein recombination comprises patterns derived from the rare combinations.

8. The system of claim 1, wherein the plurality of meta algorithmic patterns include a Confusion Matrix Pattern with an Expert Decisioner, and wherein the content processor is to further generate a training data author confusion matrix for the Confurion Matrix Pattern with the Expert Decisioner, wherein an entry in row i and column j is indicative of a probability of incorrectly assigning the text content to author j instead of author i.

9. The system of claim 8, wherein a high confusion in authorship features for a collection of authors is identified based on the author confusion matrix, and wherein the at least one meta-algorithmic pattern includes a second meta-algorithmic patterns to identify a likely author of the collection of authors.

10. The system of claim 9, wherein the collection of authors comprises two authors, and wherein the second meta-algorithmic patterns is a Tessellation and Recombination Pattern to identify a likely author of the two authors.

11. The system of claim 9, wherein the author confusion matrix is modified by aggregating entries of rows and columns associated with the collection of authors, and wherein the Confusion Matrix Pattern with an Expert Decisioner is iteratively applied to the modified author confusion matrix.

12. The system of claim 1, wherein the selector is to further receive user input via an interactive graphical user interface, the user input related to addition of a summarization engine, and selection of a new combination of summarization engines and meta-algorithmic patterns for deployment.

13. The system of claim 1, further comprising an addition of an additional summarization engine, and wherein the selector is to further select, for deployment, a second combination of meta-algorithmic patterns including the additional summarization engine, the selection based on optimizing category values.

14. A method comprising:
receiving, via a computing device, a text content for author identification;
applying a plurality of summarization engines, each summarization engine to provide a summary of the text content;
providing a meta-summary of the text content using at least two summaries by applying a plurality of meta algorithmic patterns to the at least two summaries;
identifying, from the meta-summary, authorship features associated with the text content;
determining, for a given category, a category value of the meta-summary, wherein the category value is indicative of a similarity of the authorship features to the category;
selecting, for the given category, a combination of one of the plurality of meta-algorithmic patterns and at least two of the plurality of summarization engines that provides the meta-summary that optimizes the category value for the text content that identifies an author to detect plagiarism or cheating; and
associating the text content with the selected combination of the meta-algorithmic patterns and the summarization engines.

15. A non-transitory computer readable medium comprising executable instructions to:
receive, via a computing device, a text content for author identification;
apply a plurality of summarization engines, each summarization engine to provide a summary of the text content;
provide a meta-summary of the text content using at least two summaries by applying at least one of a plurality of meta-algorithmic patterns comprising a Predictive Selection Pattern, Tessellation and Recombination Pattern, Tessellation and Recombination Pattern with an Expert Decisioner, and a Confusion Matrix Pattern with an Expert Decisioner;
identify, from the meta-summary, authorship features associated with the text content;
determine, for a given category, a category value of the meta-summary, wherein the category value is indicative of a similarity of the authorship features to the category; and
select, for the given category, a combination of one of the plurality of meta-algorithmic patterns and at least two of the plurality of summarization engines that provides the meta-summary that optimizes the category value for the text content that identifies an author to detect plagiarism or cheating.

* * * * *

UNITED STATES PATENT AND TRADEMARK OFFICE
CERTIFICATE OF CORRECTION

PATENT NO.        : 10,515,267 B2                                Page 1 of 1
APPLICATION NO.   : 15/519094
DATED             : December 24, 2019
INVENTOR(S)       : Steven J Simske It is certified that error appears in the above-identified patent and that said Letters Patent is hereby corrected as shown below:

In the Claims

In Column 14, Line 39, Claim 8, delete "Confurion" and insert -- Confusion --, therefor.

Signed and Sealed this
Seventh Day of April, 2020

Andrei Iancu
*Director of the United States Patent and Trademark Office*